US009033491B2

(12) United States Patent
Allen (10) Patent No.: US 9,033,491 B2
(45) Date of Patent: May 19, 2015

(54) SLAP BRACELET EYEGLASSES

(71) Applicant: Catherine M Allen, Vandergrift, PA (US)

(72) Inventor: Catherine M Allen, Vandergrift, PA (US)

(*) Notice: Subject to any disclaimer, the term of this patent is extended or adjusted under 35 U.S.C. 154(b) by 21 days.

(21) Appl. No.: 13/908,106

(22) Filed: Jun. 3, 2013

(65) Prior Publication Data
US 2013/0321759 A1     Dec. 5, 2013

Related U.S. Application Data

(60) Provisional application No. 61/654,123, filed on Jun. 1, 2012.

(51) Int. Cl.
*G02C 3/04* (2006.01)
*G02C 5/16* (2006.01)
*G02C 5/00* (2006.01)

(52) U.S. Cl.
CPC .. *G02C 3/04* (2013.01); *G02C 5/16* (2013.01); *G02C 5/006* (2013.01)

(58) Field of Classification Search
USPC ............... 351/65, 63, 114, 111, 158, 41, 56; 206/5; 368/10, 278
See application file for complete search history.

(56) References Cited

U.S. PATENT DOCUMENTS

| | | | |
|---|---|---|---|
| 2,273,434 A | 2/1942 | Burchell et al. | |
| 4,720,186 A | 1/1988 | Douillard | |
| 4,863,013 A * | 9/1989 | Eastman | 206/5 |
| 5,065,373 A | 11/1991 | Alcantara Maia | |
| 5,110,197 A | 5/1992 | Arad | |
| 5,604,548 A * | 2/1997 | Kanbar | 351/56 |
| 6,033,068 A | 3/2000 | Spilkin et al. | |
| D454,904 S | 3/2002 | Marcuccilli | |
| 6,361,165 B1 * | 3/2002 | Danneberg | 351/56 |
| 6,581,760 B1 * | 6/2003 | Robertson | 206/5 |
| 7,117,990 B2 | 10/2006 | Sarif | |
| 7,287,851 B2 | 10/2007 | Amioka | |
| 7,748,843 B2 | 7/2010 | Stewart | |
| 8,678,580 B2 * | 3/2014 | Daole | 351/65 |

* cited by examiner

*Primary Examiner* — Hung Dang
(74) *Attorney, Agent, or Firm* — James Ray & Assoc.

(57) ABSTRACT

An article of eyewear includes an elongated bi-stable spring, two lenses disposed along a side edge of the elongated bi-stable spring in a spaced apart relationship with each other along the side edge, a flexible covering encasing the elongated bi-stable spring and the two lenses, and an arcuate shape defined between the two lenses.

20 Claims, 12 Drawing Sheets

SLAP BRACELET EYEGLASSES

CROSS-REFERENCE TO RELATED APPLICATIONS

This application is related to and claims priority from U.S. Provisional Patent Application Ser. No. 61/654,123 filed on Jun. 1, 2012.

FIELD OF THE INVENTION

The present invention relates, in general, to article of eyewear and, more particularly, this invention relates to reading or other lenses that can be worn on the wrist with rapid removal and return as needed and, yet more particularly, the instant invention relates to the article of eyewear utilizing a bi-stable ribbon spring member.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND OF THE INVENTION

Many activities, especially outdoor ones such as horseback riding, swimming, and running, make it impractical for participants to wear eyeglasses on the face all or even part of the time, especially if the lenses are needed only for close-up reading. Prior to the present invention, such individuals must carry their reading glasses, generally utilizing expansive frames, in a pocket or in some similar fashion, all of which necessitate significant time to access the glasses and then return them.

Wrapping glasses around or attaching them to the wrist has been disclosed previously in certain ways. For instance, Amioka in U.S. Pat. No. 7,287,851 discloses eyewear frames that can bend around the wrist. Stewart in U.S. Pat. No. 7,748,843 and Alcantara Maia in U.S. Pat. No. 5,065,373 teach ways of carrying reading lenses connected to a special wristwatch.

Bi-stable ribbon springs have been used for years to aid in attachment of decorated fabric or watches to the wrist. To the best knowledge of the Applicant, imbedding reading or other lenses into such slap-on bracelets has not been disclosed or used before now.

Therefore, there is a need for an article of eyewear that is configurable between a generally straight elongated form for reading purposes and a curved form to be worn on the wrist of the user.

SUMMARY OF THE INVENTION

The invention provides an article of eyewear. The article of eyewear includes an elongated bi-stable spring. Two lenses are disposed along a side edge of the elongated bi-stable spring in a spaced apart relationship with each other along the side edge. A flexible covering encases the elongated bi-stable spring and the two lenses. An arcuate shape portion is defined between the two lenses.

OBJECTS OF THE INVENTION

It is, therefore, one of the primary objects of the present invention to provide an article of eyewear that makes reading lenses rapidly available to those engaging in activities that generally preclude wearing reading glasses on the face.

Another object of the present invention is to provide an article of eyewear that enables convenient yet attractive means of keeping reading lenses readily available.

Still another object of the present invention is to provide an article of eyewear that enables active people to rapidly place and remove reading lenses attachable around one's wrist.

Yet another object of the present invention is to provide an article of eyewear with a convenient wrist band device that can removably accommodate slip-in lenses.

An additional object of the present invention is to provide an article of eyewear including lenses attached to a bi-stable ribbon spring.

Another object of the present invention is to provide an article of eyewear that includes lenses attached to a bi-stable ribbon spring and further includes pull-out temples.

Yet another object of the present invention is to provide an article of eyewear having pair of lenses and a bi-stable ribbon spring embedded into an elastomeric material.

Another object of the present invention is to provide an article of eyewear having pair of lenses and a bi-stable ribbon spring sewn into a fabric material.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

Figure 1:
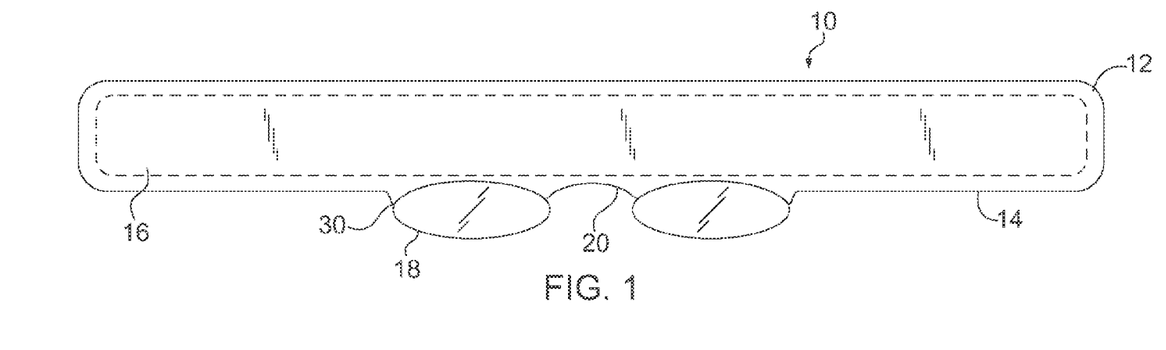
FIG. 1 is a plan view of an article of eyewear of the instant invention illustrating a pair of lenses attached to an elongated bi-stable spring.

Referring initially to FIG. 1, therein is provided a plan view of an article of eyewear of the present invention, generally shown as 10. An elongated, substantially flexible strap or member 12 typically encases or includes one or more thin bi-stable metal or plastic strips defining what is commonly known as a bi-stable ribbon spring 16 that can hold and be readily transferred between two stable positions or forms—either a straight semi-rigid band, or a curved band like a bracelet. Along one long or side edge 14 of the strap 12, two lenses 18 are attached in a spaced apart relationship with each other, defining an arcuate gap or nose bridge 20 therebetween. In this form of FIG. 1, the lenses 18 would typically be permanently attached to the side edge 14 with an adhesive 30 or may be even attached directly to the long side edge of the bi-stable ribbon spring 16.

Figure 2:
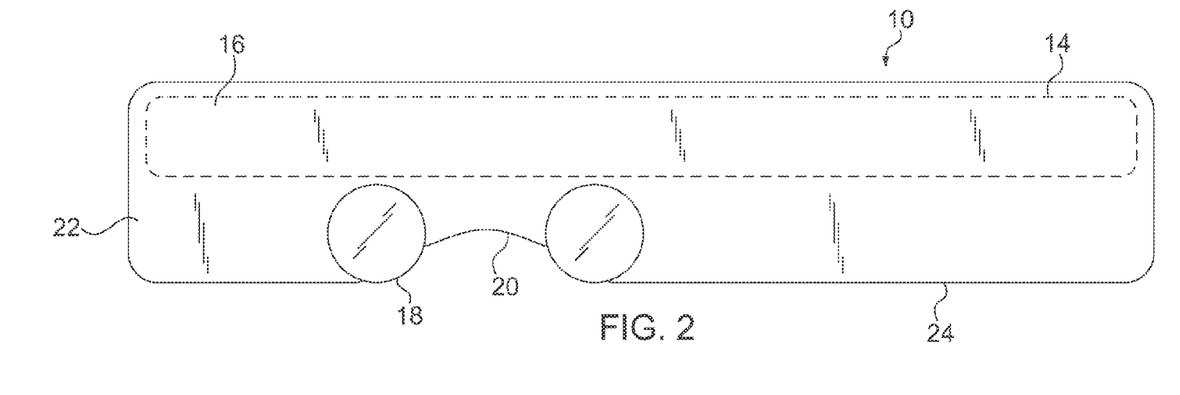
FIG. 2 provides a plan view of the article of eyewear of FIG. 1 encased into a flexible covering.

FIG. 2 provides a plan view of the article of eyewear 10, wherein the bi-stable band or ribbon spring 16 is encased within a larger flexible covering 22, which will be of sufficient length to fit around one's wrist with some overlap at the ends. Integrally built into the elongated flexible covering 22 is at least one, and preferably a pair of lenses 18, flexible or rigid, glass or plastic. In this embodiment, the lenses 18 do not protrude below the side edge 24, and need not be centered along the length of the strap 12.

Figures 3, 4:
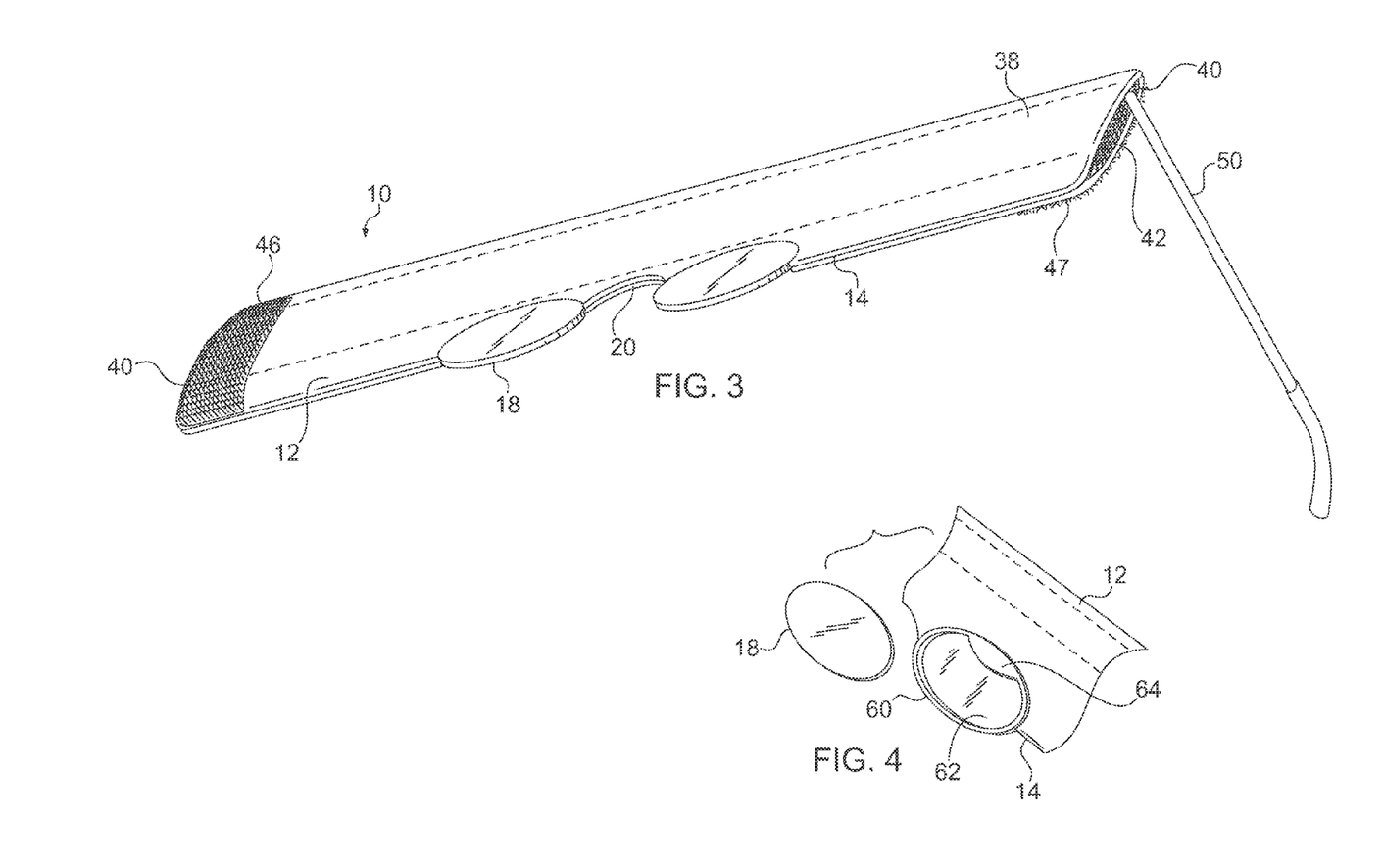
FIG. 3 provides a perspective view of the article of eyewear of FIG. 1 with a hollow sleeve and Velcro fasteners.
FIG. 4 is a partial perspective view of a removable lens option for the article of eyewear of FIG. 1.
Figure 5:
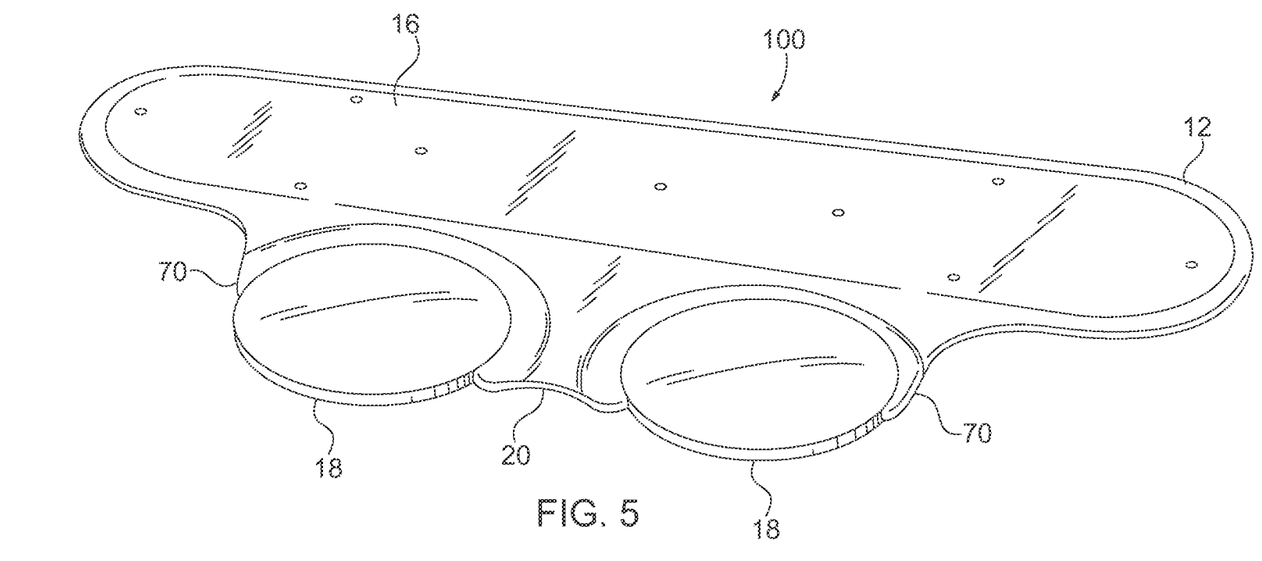
FIG. 5 is a perspective view of the article of eyewear of FIG. 1 having a pair of lenses and elongated bi-stable spring molded into a flexible covering manufactured from an elastomeric material.
Figure 6:
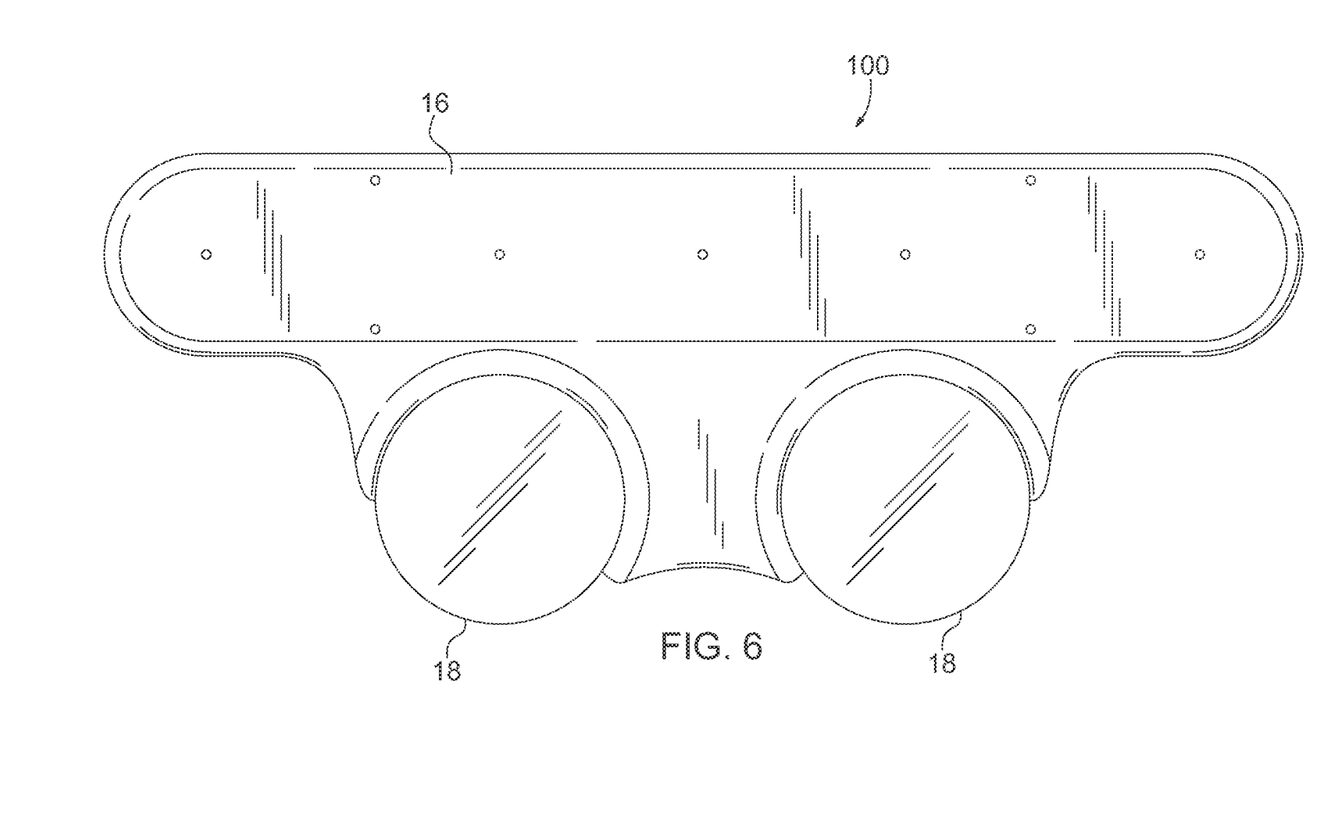
FIG. 6 is a top planar view of the article of eyewear of FIG. 5.
Figure 7:
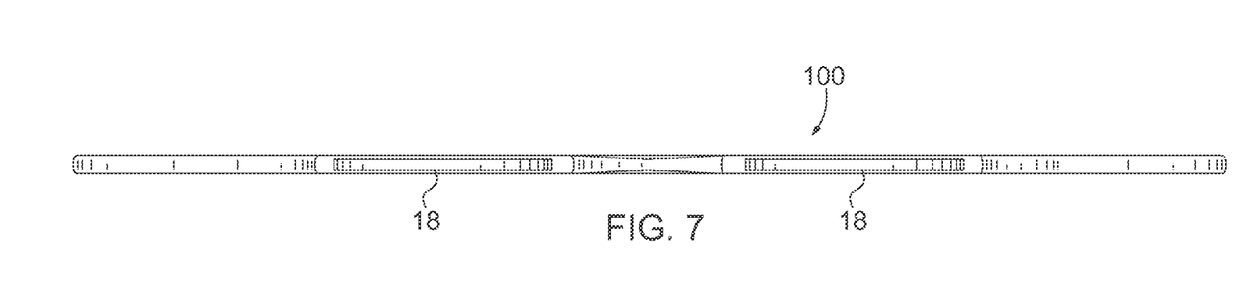
FIG. 7 is a front elevation view of the article of eyewear of FIG. 5.
Figure 8:
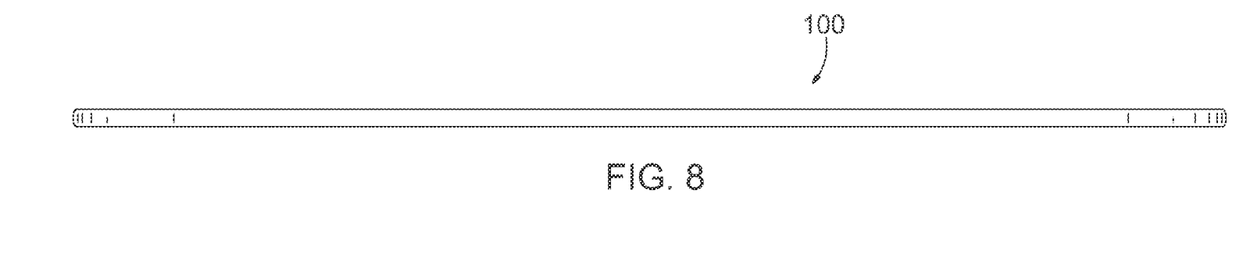
FIG. 8 is a rear elevation view of the article of eyewear of FIG. 5.
Figure 9:
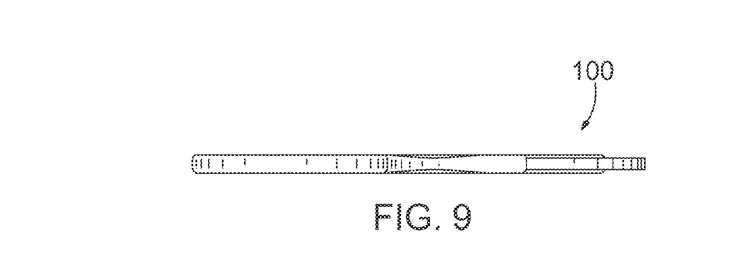
FIG. 9 is a left/right elevation view of the article of eyewear of FIG. 5.
Figure 10:
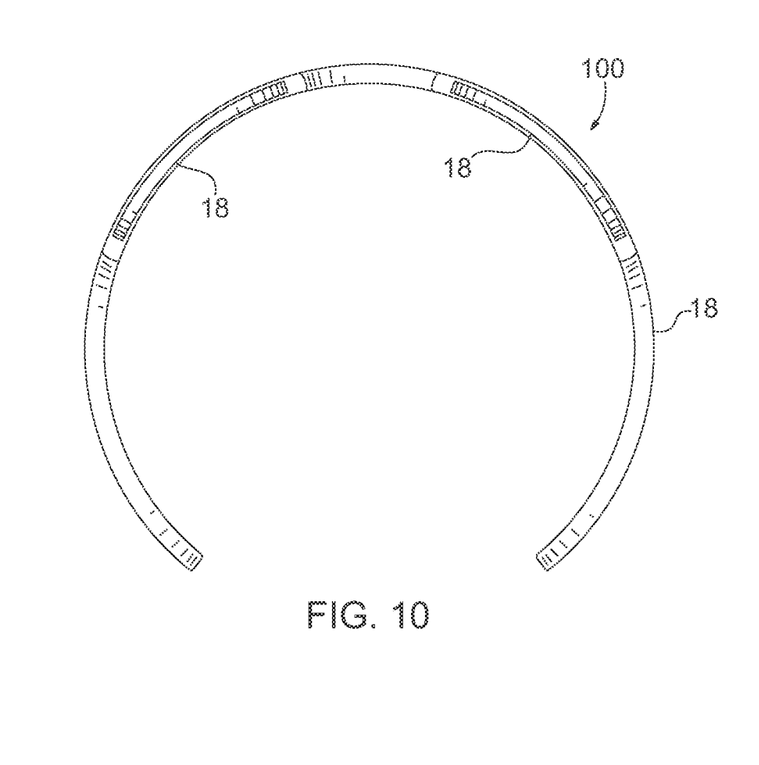
FIG. 10 is a front elevation view of the article of eyewear of FIG. 5 in a curved band-like form.
Figure 11:
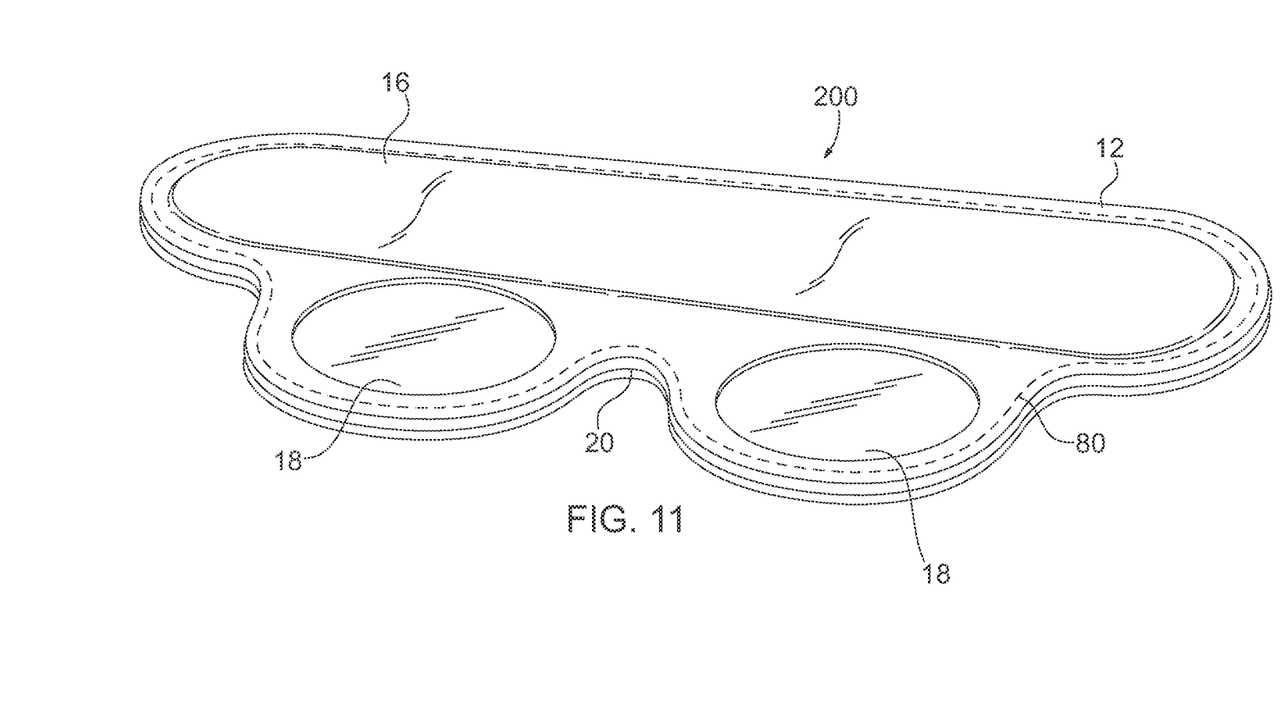
FIG. 11 is a perspective view of the article of eyewear of FIG. 1 having a pair of lenses and elongated bi-stable spring sewn into a flexible covering manufactured from a fabric material.
Figure 12:
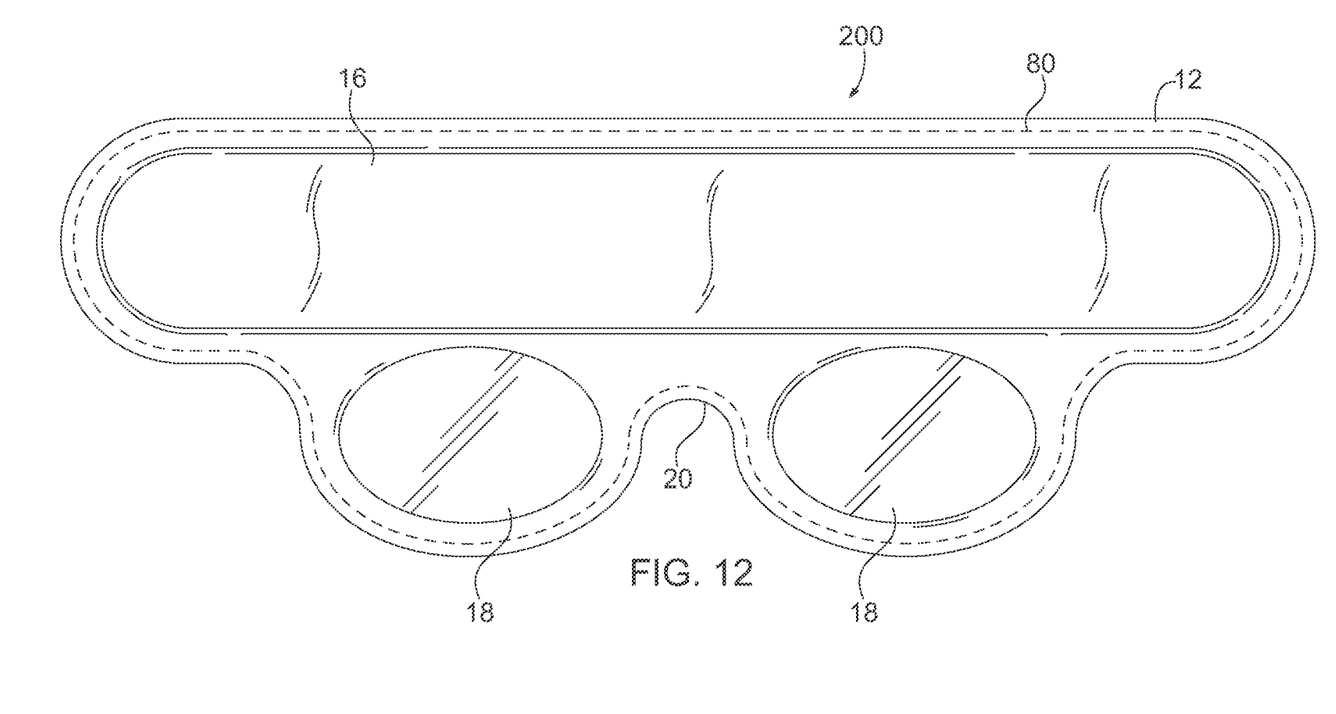
FIG. 12 is a top planar view of the article of eyewear of FIG. 11.
Figure 13:
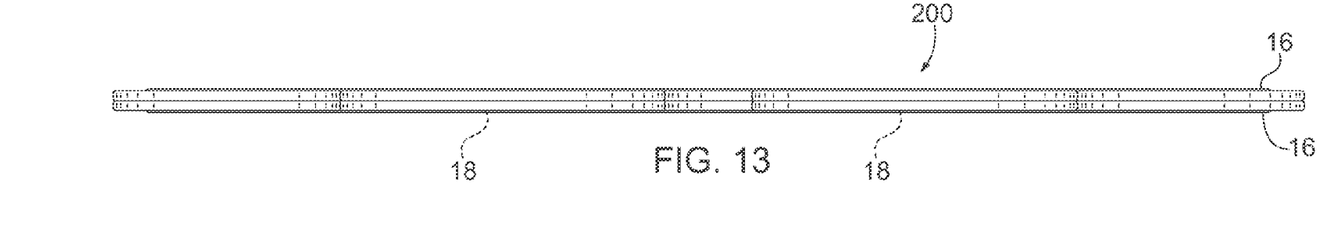
FIG. 13 is a front elevation view of the article of eyewear of FIG. 11.
Figure 14:
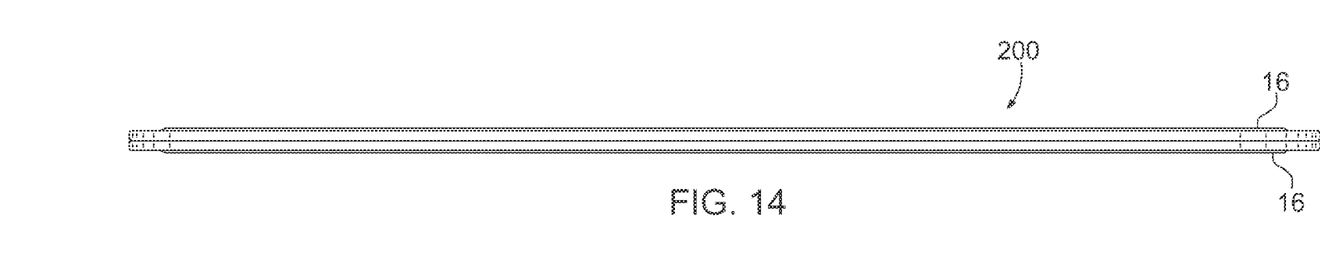
FIG. 14 is a rear elevation view of the article of eyewear of FIG. 11.
Figure 15:
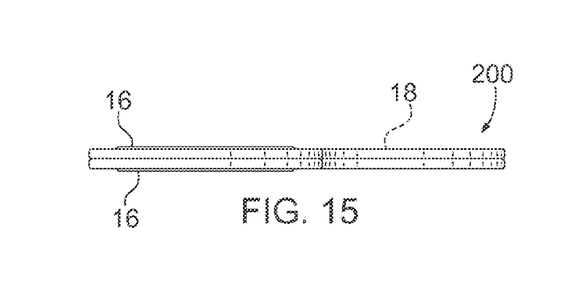
FIG. 15 is a left/right elevation view of the article of eyewear of FIG. 11.
Figure 16:
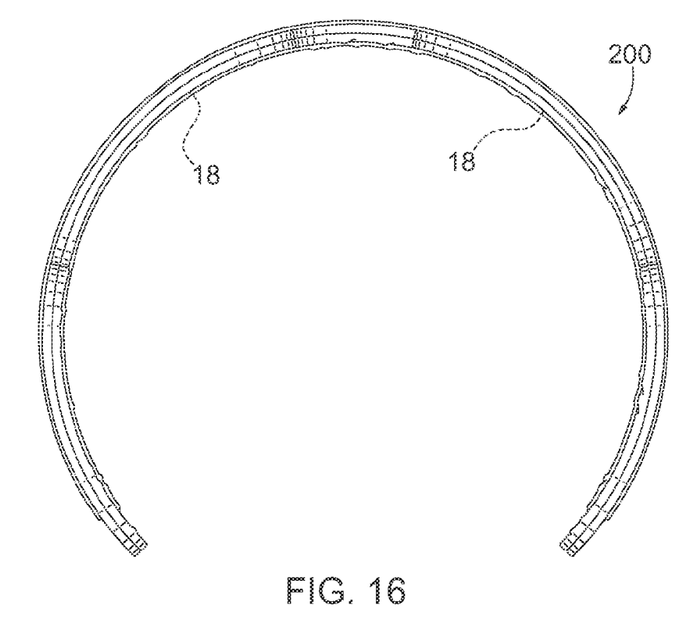
FIG. 16 is a front elevation view of the article of eyewear of FIG. 11 in a curved band-like form.
Figure 17:
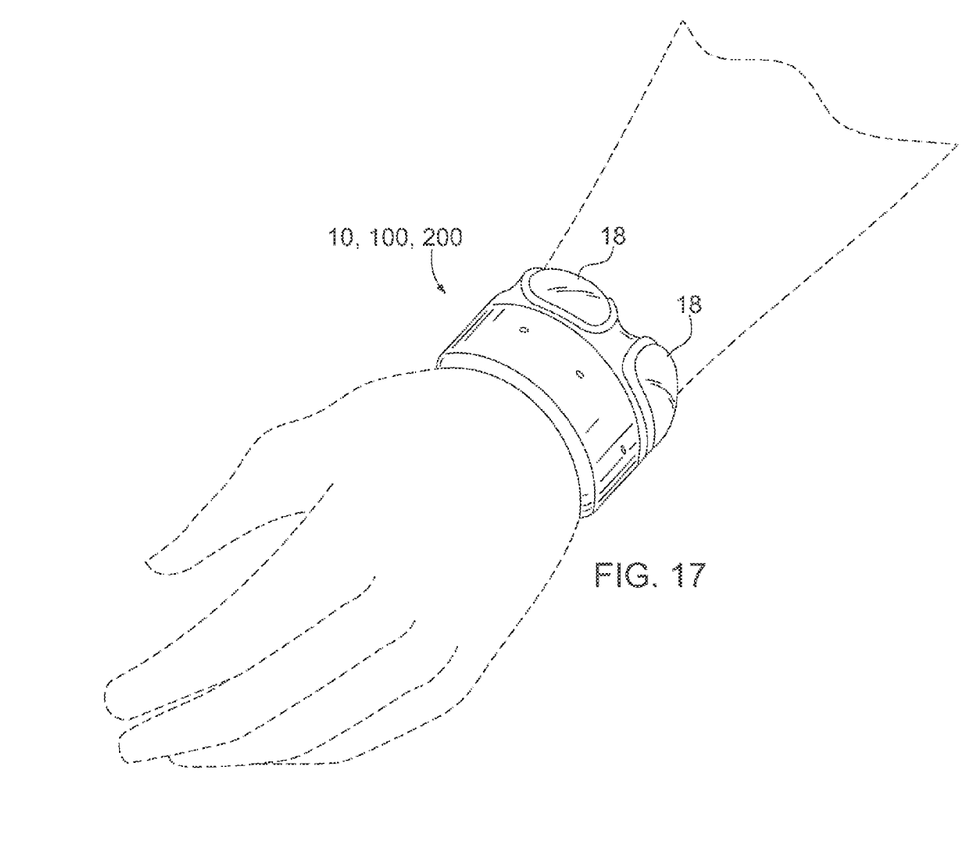
FIG. 17 illustrates an environmental view of the articles of eyewear of preceding figures worn on the wrist of the user.

FIG. 3 provides a perspective view of a third embodiment of the article of eyewear 10, wherein the lenses 18 are disposed along the side edge 14 with an arcuate gap 20 between them. A hollow sleeve 38 runs along the entire length of the strap 12 with openings 40 at both ends. In one variation, the sleeve 38 holds flexible temples 50, only one of which is shown, that can be slid in and out through a respective end opening 40 of the hollow sleeve 38. Each end opening 40 can be held closed by hook and loop fastener 42. The hollow sleeve 38 can also accommodate the bi-stable ribbon spring 16, or alternatively, hook and loop fastener material 46 and 47 can be used to releasably hold the reading implement 10 around user's wrist. It will be understood that one hollow sleeve 38 may be provided as a pair of end sleeves or cavities, each sized and configured to slideably receive one temple 50, particularly when the bi-stable ribbon spring 16 is not used.

FIG. 4 illustrates a partial perspective close-up view of a removable lens option for any of the above three forms of FIGS. 1-3. Along one long side edge 14 of the strap 12 or the long side edge of the bi-stable ribbon spring 16 is at least one lens pocket 60, which is configured to removably retain a lens 18. The lens 18 would slide in or out via the pocket opening 64. The pocket opening 64 is inset inwardly from a side edge 14 of the strap 12. The main portion of the pocket 62 is either void of any material, or is a transparent material, such as vinyl. This enables the user of the article of eyewear 10 to insert whatever lens suits him/her, and to replace any that get damaged. It is also contemplated that material of the pocket 62 may be tinted, permanently or variably, for sun and glare protection.

The flexible covering 22 is provided by the instant invention in different materials, including, but not limited to, rubber and fabric.

FIGS. 5-10 illustrate a new design of the article of eyewear 100 wherein elongated strap 12 includes a bi-stable spring 16 and two lenses 18 that are encased by the flexible covering 22 being manufactured from an elastomeric material, such as rubber.

In this form, it is not necessary to attach the lenses 18 to the strap 12 or the bi-stable spring 16, as these components are advantageously positioned in a desired relationship to each other, with this relationship being maintained during manufacturing process, for example such as a molding or casting process. After the molding process, the lenses 18 are separated from the edge of the bi-stable spring 16 with a material region 70.

The above described hook and loop fasteners 46, 47 are not shown but are contemplated in the article of eyewear 100.

FIGS. 11-16 illustrate a new design of the article of eyewear 200 wherein elongated strap 12 includes a bi-stable spring 16 and two lenses 18 that are sewn into the flexible covering 22 being manufactured from a fabric material secured at the edge with conventional stitches 80 or any other suitable method of securing two pieces of fabric material therebetween.

Figure 18:
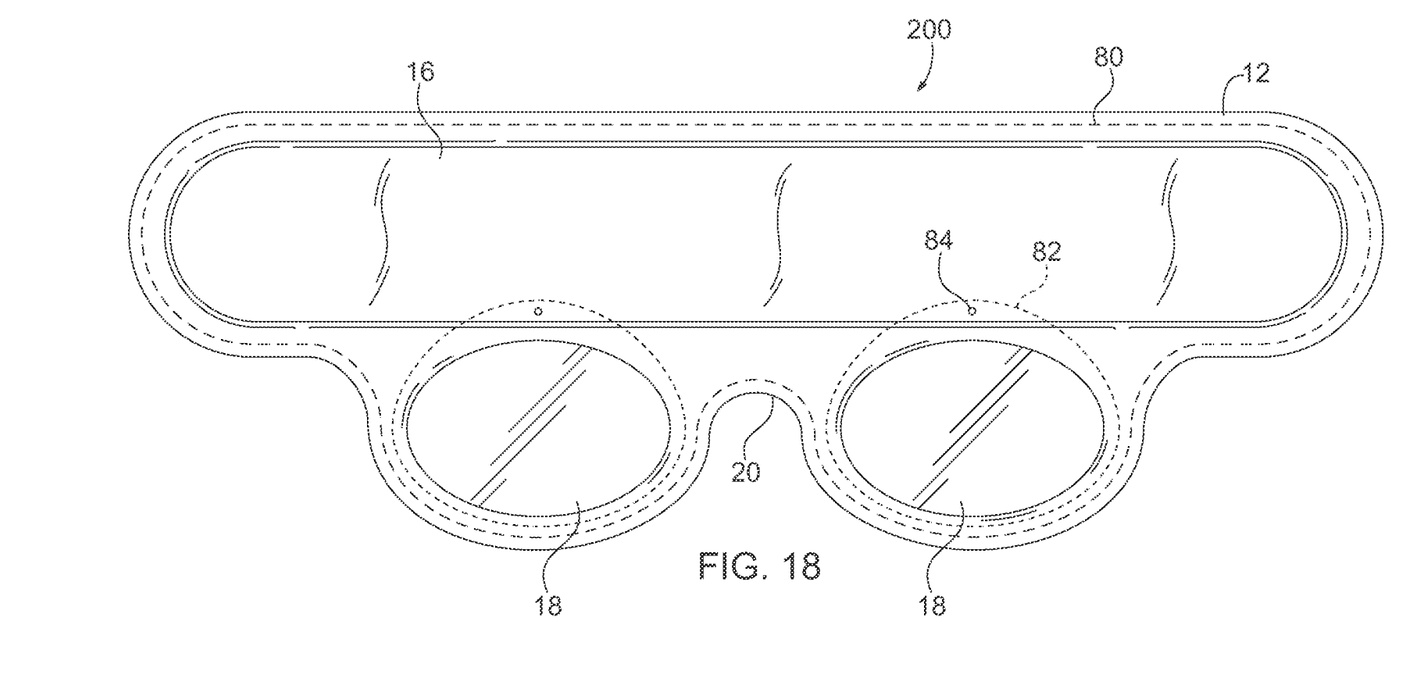
FIG. 18 illustrates an alternative form of the article of FIG. 11 with the elongated bi-stable spring fastened to both lenses.

Using fabric material of FIGS. 11-16 may require fastening of the lenses 18 to the elongated strap 12 either with the use of the above described adhesive 30 or by providing complimentary and mating apertures 84, as best shown in FIG. 18 with the fasteners, for example of a rivet type, removed for clarity. In this form, the lens 18 is provided with either a partial or complete peripheral region 82 that overlaps the surface of the bi-stable spring 16. Additional retention will be provided by the fabric material itself. It will be also understood that the bi-stable spring 16 may be provided with edge abutment to overlap the peripheral region 82. The fasteners (not shown) can be either hidden below the flexible covering 22 or may protrude beyond the exterior surface thereof.

The article of eyewear 10, 100, or 200 in either of the above described form, while in a flat configuration, will be held at one end by a hand with the lenses 18 up near that which the user/wearer desires to read. Afterward, the article of eyewear 10, 100, or 200 is slapped against a wrist causing it to curl around and stay loosely on the user's wrist or being secured with above described fasteners 46, 47, as best shown in FIG. 18. The rapid removal and reapplication to the wrist is one of the major advantages of the present invention, which makes reading lenses readily available in an attractive form.

The instant invention also contemplates a single lens 18 being attached or positioned adjacent to the strap or member 12 may replace a pair of lenses 18 illustrated above in various Figures.

The lens or lenses 18 may be of a conventional reading quality, magnifying type or just a plain (non-reading, non-magnifying) type and may be tinted, permanently or variably, for sun and glare protection.

It is also contemplated that the strap or member 12 may be of a length sufficient to position and secure the article of eyewear 10, 100, or 200 around wearer's face and head, for example with above described hook and loop fasteners 46, 47. It would be appreciated that in this form, the elongated strap or member 12 will coil around wearer's wrist.

It has been found that the article of eyewear 10, 100, or 200 is advantageous for use by anybody performing physical activity and needing to temporarily read printed material without the burden of carrying conventional glasses. For example, a hiker may temporarily use the article of eyewear 10, 100, or 200 to read a map or compass or intermittently wear it on partially cloudy days, when sun is not obstructed by a cloud and carry it on the wrist when sun is covered by the cloud.

The article of eyewear 10, 100, or 200 may be provided of a waterproof quality and in configuration and/or ornamentation suitable for evening wear.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. An article of eyewear comprising:
   (a) an elongated member comprising a bi-stable spring, whereby said elongates member is configured to transfer between a straight, semi-rigid form and a curved form; and
   (b) a lens disposed along a side edge of said elongated member and is being supported thereby.

2. The article of eyewear, according to claim 1, wherein said lens is two lenses disposed in a spaced apart relationship with each other along said side edge of said elongated member.

3. The article of eyewear, according to claim 2, wherein said two lenses are permanently attached to said side edge of said elongated member.

4. The article of eyewear, according to claim 2, wherein a portion of said side edge between said two lenses has an arcuate shape.

5. The article of eyewear of claim 1, further comprising a flexible covering member sized to receive said elongated member and said lens therewithin.

6. The article of eyewear of claim 5, wherein said lens is two lenses and wherein peripheral edges of said two lenses do not protrude beyond a side edge of said covering member and wherein said side edge of said covering member is interrupted to expose or define an arcuate portion of said elongated member, said arcuate portion disposed between said two lenses.

7. The article of eyewear of claim 1, further comprising a hollow sleeve disposed along a length of said elongated member, said hollow sleeve having an opening at each end of said elongated member.

8. The article of eyewear of claim 7, further comprising a fastener at each open end of said hollow sleeve, said fastener selectively opening and closing said each end.

9. The article of eyewear of claim 7, further comprising a pair of flexible temples disposed within said hollow sleeve, each of said pair of flexible temples positioning for movement through a respective open end of said hollow sleeve.

10. The article of eyewear of claim 1, further comprising a fastener at ends of said elongated member, said fastener configured to releaseably retain said elongated member in a curved form around a wrist of a wearer.

11. The article of eyewear of claim 1, wherein said lens is a pair of lenses and wherein said article of eyewear further comprises a pair of spaced apart pockets, each having an opening and wherein each lens is adapted for a sliding movement in and out of a respective pocket through an opening thereof.

12. The article of eyewear of claim 11, wherein said pocket opening is inset inwardly from said side edge of said elongated member.

13. The article of eyewear of claim 1, wherein said lens is separated from an edge of said elongated member.

14. An article of eyewear comprising:
   (a) an elongated bi-stable spring;
   (b) two lenses disposed along a side edge of said elongated bi-stable spring in a spaced apart relationship with each other along said side edge;
   (c) a flexible covering encasing said elongated bi-stable spring and said two lenses; and
   (d) an arcuate shape defined between said two lenses.

15. The article of eyewear of claim 14, wherein said two lenses are attached to said side edge of said elongated bi-stable spring.

16. The article of eyewear of claim 14, further including a flexible covering encasing said elongated bi-stable spring and wherein said two lenses are attached to a side edge of said flexible covering.

17. The article of eyewear of claim 16, further comprising a fastener at ends of said flexible covering, said fastener configured to releaseably retain said article of eyewear in a curved form around a wrist of a wearer.

18. The article of eyewear of claim 14, wherein each of said two lenses includes a region thereof that at least partially overlaps a surface of said elongated bi-stable spring and wherein said article of eyewear further comprises mating apertures formed through a thickness of said overlapping region and through a thickness of said elongated bi-stable spring.

19. An article of eyewear comprising:
   (a) an elongated member;
   (b) a flexible covering member sized to receive said elongated member and said lens therewithin; and
   (c) two lenses disposed along a side edge of said elongated member and is being supported thereby, wherein peripheral edges of said two lenses do not protrude beyond a side edge of said flexible covering member and wherein said side edge of said flexible covering member is interrupted to expose or define an arcuate portion of said elongated member, said arcuate portion disposed between said two lenses.

20. The article of eyewear of claim 14, wherein each of said two lenses includes a region thereof that at least partially overlaps a surface of said elongated bi-stable spring and wherein said article of eyewear further comprises mating apertures formed through a thickness of said overlapping region and through a thickness of said elongated bi-stable spring.

* * * * *